United States Patent [19]

Shoji

[11] Patent Number: 4,781,018

[45] Date of Patent: Nov. 1, 1988

[54] SOLAR THERMAL PROPULSION UNIT

[75] Inventor: James M. Shoji, Calabasas, Calif.

[73] Assignee: Rockwell International Corporation, El Segundo, Calif.

[21] Appl. No.: 878,738

[22] Filed: Jun. 26, 1986

[51] Int. Cl.⁴ .............................................. H05B 1/00
[52] U.S. Cl. .................................... 60/203.1; 60/232; 60/641.8; 60/641.14; 244/173
[58] Field of Search ...................... 60/203.1, 202, 229, 60/232, 641.8, 641.11, 641.12, 641.13, 641.14, 641.15, 200.1; 126/449; 244/173, 172, 53 R, 62

[56] References Cited

U.S. PATENT DOCUMENTS

| | | | |
|---|---|---|---|
| 3,097,480 | 7/1963 | Sohn | 60/203.1 |
| 3,203,167 | 8/1965 | Green, Jr. | 60/641.14 |
| 3,968,652 | 7/1976 | Chevalier | 60/641 |
| 4,036,012 | 7/1977 | Monsler | 60/203 |
| 4,038,557 | 7/1977 | Gildersleeve et al. | 60/203.1 |
| 4,310,747 | 1/1982 | Rice et al. | 126/449 |
| 4,326,504 | 4/1982 | Guadard et al. | 126/449 |
| 4,354,348 | 10/1982 | Lee | 60/203.1 |
| 4,403,755 | 9/1983 | Gutsche | 244/53 R |
| 4,475,538 | 10/1984 | Percival et al. | 126/439 |
| 4,528,978 | 7/1985 | Robinson | 60/203.1 |
| 4,643,168 | 2/1987 | Butler | 126/449 |

FOREIGN PATENT DOCUMENTS

| | | | |
|---|---|---|---|
| 1120207 | 12/1961 | Fed. Rep. of Germany | 60/232 |
| 2300913 | 9/1976 | France | 60/641.8 |
| 2432687 | 2/1980 | France | 126/449 |
| 2006878A | 5/1979 | United Kingdom | 60/641.14 |

Primary Examiner—Louis J. Casaregola
Assistant Examiner—Donald E. Stout
Attorney, Agent, or Firm—H. Fredrick Hamman; Harry B. Field; David C. Faulkner

[57] ABSTRACT

This invention relates to a space vehicle 10 in which solar radiation is utilized to generate thrust by virtue of a solar thermal propulsion unit 12. The propulsion unit comprises basically reaction engines 14 including a DeLaval nozzle 22, heating chamber 26, solar window 28 and inflatable paraboloid solar collector 34.

3 Claims, 2 Drawing Sheets

SOLAR THERMAL PROPULSION UNIT

BACKGROUND OF THE INVENTION

1. Technical Field of the Invention

The present invention relates to reaction or rocket engines and rocket thrust chambers such as found in a space vehicle. More particularly, the present invention is concerned with a rocket engine incorporating a solar thermal propulsion unit for generating thrust utilizing solar radiation.

2. Background Art

Propulsion systems and particularly propulsion systems utilized in space going vehicles are well known. The design and function of rocket engines vary considerably depending upon performance requirements.

Unmanned interplanetary probes and the like as well as those vehicles which may be used in the future for traversing distances between a space station, a lunar base or other destinations will bnefit significantly from high specific impulses but may only require a reduced thrust capability.

One known solar propulsion concept utilizes an alkali metal seed added to the propellant. The propellant is heated in a heat exchanger by solar radiation and thereafter the vapor or expanded gases are discharged from a convergent-divergent nozzle to effect suitable thrust. This type of system is heavy and requires a complex delivery system to feed the fuel to the heating element and thereafter convey the vapor to the nozzle exit.

Another concept utilizes a solar rocket absorber of rhenium tubes to heat liquid hydrogen which is then conveyed out of the convoluted rhenium tubes to a thruster. This design has limited performance capability and is difficult to manufacture.

DISCLOSURE OF INVENTION

Accordingly, the present invention overcomes the disadvantages and problems set forth hereinabove. The present invention provides a solar thermal propulsion unit for generating thrust in a space vehicle comprising:
at least one controllable rocket regenerative engine
  including a rocket engine thrust chamber assembly
  further comprising:
    (a) a DeLaval nozzle including an exhaust outlet;
    (b) a heating chamber;
    (c) a solar window;
    (d) a solar radiation absorber assembly retained within the heating chamber;
a propellant storage and delivery system;
means for delivering propellant to the absorber assembly; and
means for collecting, concentrating and delivering solar radiation to and through the solar window and into the solar radiation absorber assembly, the absorber assembly receiving concentrated solar radiation for heating the propellant in the absorber assembly to generate thrust.

Accordingly, it is an object of the present invention to provide a propulsion unit for a space vehicle which is simplistic in design, efficient in operation, and delivers high specific impulse values (|1000 1 bf sec/1 bm).

Another object of the present invention is to provide a space vehicle utilizing solar thermal propulsion which provides controllable specific impulses and thrust levels.

Yet another object of the invention is a propulsion system which makes efficient use of an available power source, the sun, and therefore the development of a power source is not required.

These and other objects and features of the present invention will be apparent from the following detailed description, taken with reference to the accompanying drawings. The same elements or parts throughout the figures of the drawings are designated by the same reference characters.

DETAILED DESCRIPTION

Figure 1:
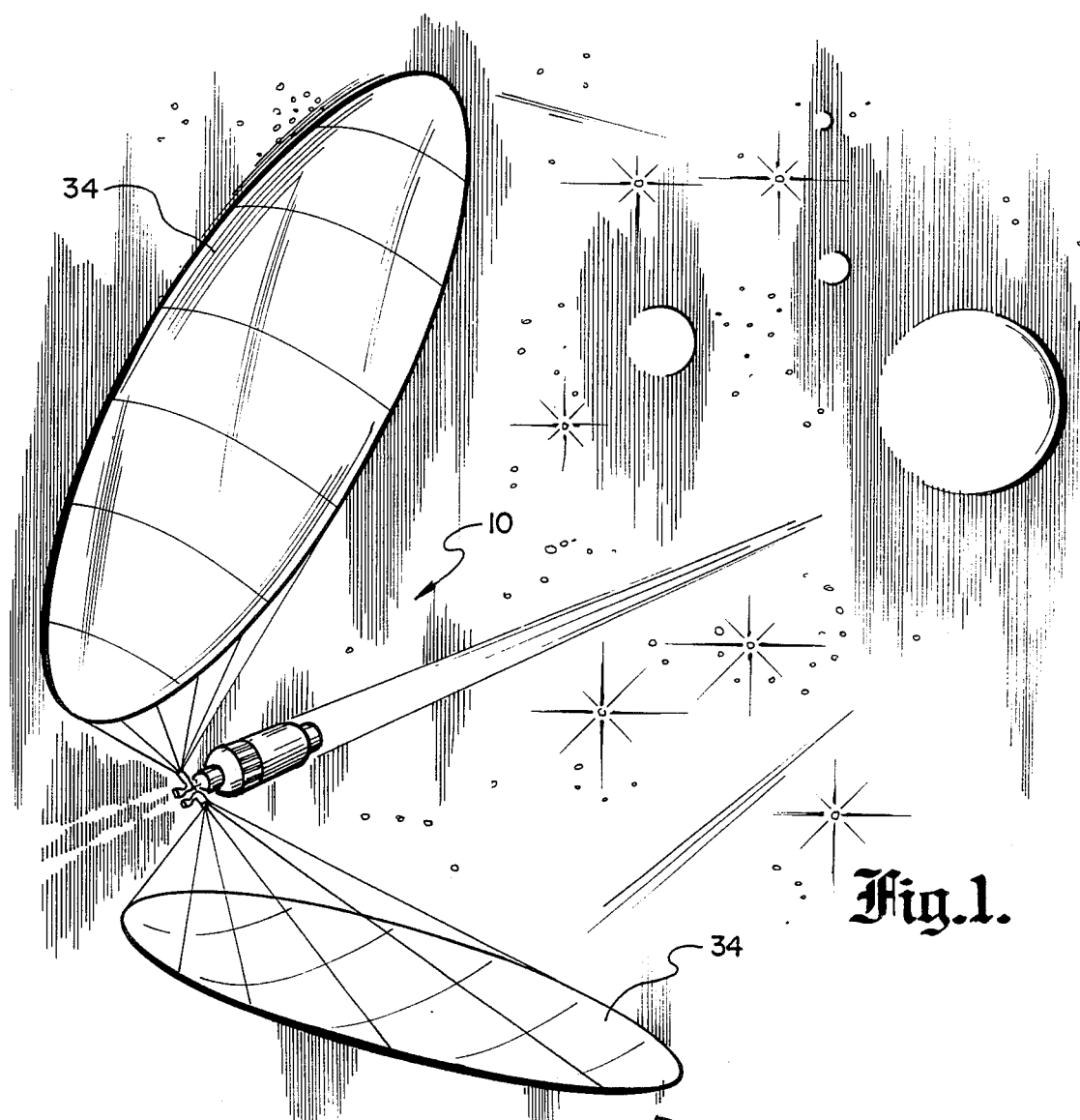
FIG. 1 is a representative view of a space vehicle utilizing a solar thermal propulsion unit emboding the present invention.
Figure 2:
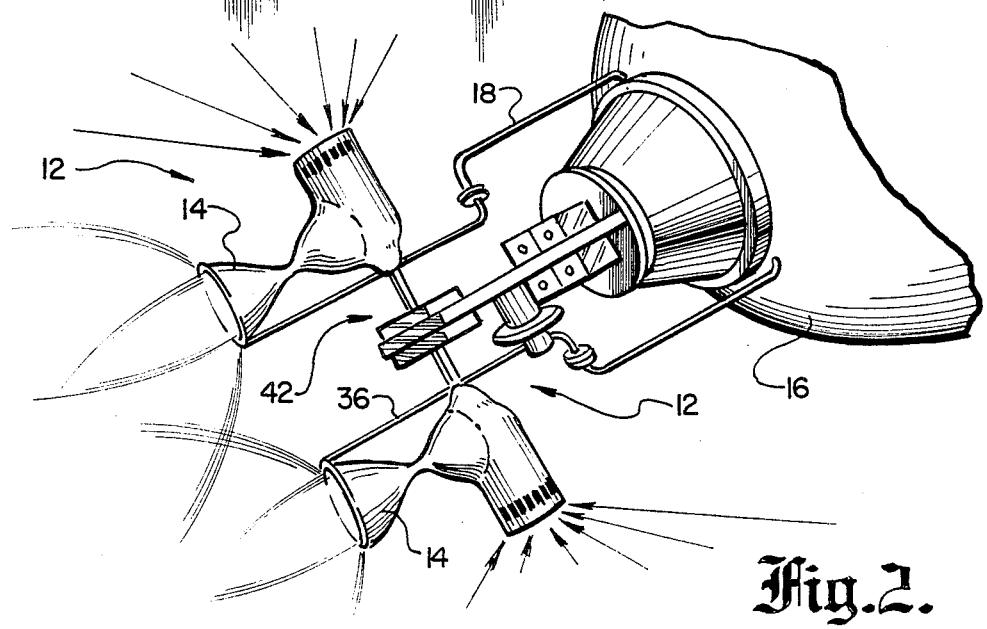
FIG. 2 is a partial schematic of one embodiment of a solar thermal propulsion unit including a propellant storage and delivery system.
Figure 3:
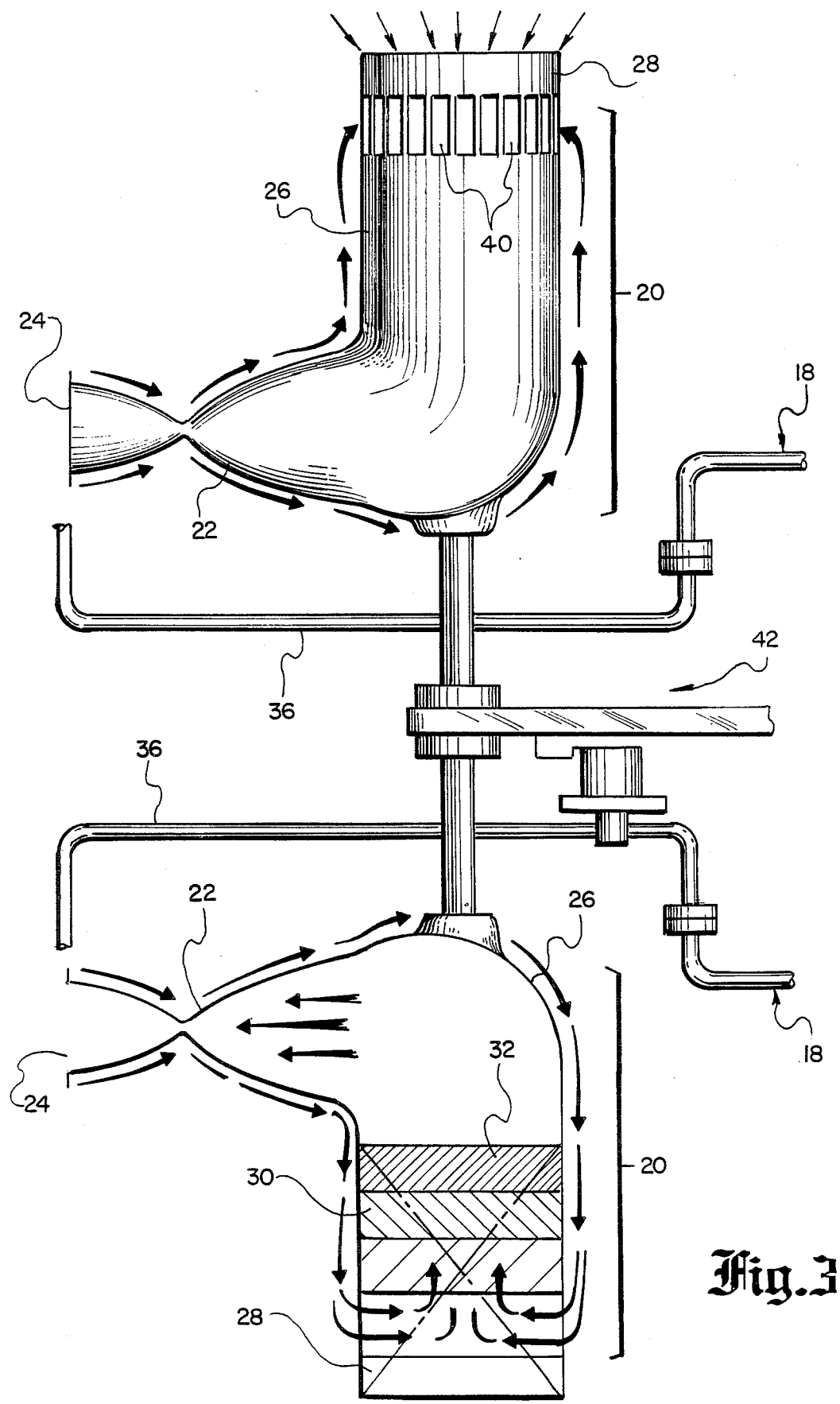
FIG. 3 is a partial isometric view of the solar thermal propulsion unit according to the present invention.

Referring to the drawings, FIG. 1 depicts a space vehicle 10 utilizing a solar thermal propulsion unit according to the invention. As shown in FIGS. 2 and 3, the solar thermal propulsion unit 12 comprises controllable rocket regenerative engines 14 in functional cooperation with a propellant storage tank 16 and delivery system 18 associated generally with the space vehicle. Each rocket engine, as shown in more detail in FIG. 3, includes rocket engine thrust chamber assembly generally designated 20, a DeLaval nozzle 22 including an exhaust outlet 24, a heating chamber 26, and a solar window 28. Within the heating chamber there is disposed a solar radiation absorber assembly 30 of graded porous material in stacked configuration positioned intermediate the engine nozzle and the solar window. The porous material further defines a continuous porosity to propellant flowing therethrough as well as defining a increasing porosity relative to the passage of solar radiation entering through the solar window. While the solar radiation absorber material as shown in FIG. 3 is configured as a stack of porous wafers or discs 32, it is to be understood that the physical configuration thereof may also be cylindrical in shape or of any other suitable design. The primary feature design consideration is the aformentioned porosity with respect to the passage of solar radiation and propellant through the material. In addition, the porous material may be fabricated by the chemical vapor deposition over a graphite matrix of a composition selected from the group comprising zirconium carbide, tantalum carbide, hafium carbide, and a combination thereof.

In operation, solar radiation is collected, concentrated and delivered (focused) to and through the solar window by means of attached inflatable paraboloid solar collectors 34 (see FIG. 1). As the concentrated solar radiation passes through the solar window 28, propellant (liquid hydrogen) is introduced into thrust chamber assembly 20 through conduits 36 from a propellant storage tank 16 as indicated by the arrows in FIG. 3. The propellant flowing through conduits 36 is preheated by contact with the DeLaval nozzle 22 prior to entering the thrust chamber. This also cools the thrust chamber assembly.

At the end of the rocket engine nearest the soar window, propellant is injected through a plurality of circumferentially spaced propellant injection ports 40 located intermediate the solar window and the stacked radiation absorber material (see FIG. 3). The propellant passes downwardly through the graded porous material and is heated to about 6700° K. by the concentrated solar radiation impining upon the absorber assembly. The heated propellant then continues through the heating chamber, and the DeLaval nozzle where it attains supersonic velocity and passes through the exhaust outlet imparting thrust to the space vehicle. Sensors and propellant pump motors and the like (not shown) which are known in the art are provided for effecting the transfer of propellant into the rocket engine injection ports.

As shown in FIGS. 2 and 3, the solar thermal propulsion unit is further provided with a motor and gear assembly 42 for defining the thrust orientation, i.e. directional control, of the space vehicle when engaged by on-board control means such as a computer (not shown). The motor and gear assembly effects directional control by rotating or swiveling the solar thermal propulsion unit 12.

It will of course be realized that various modifications can be made in the design and operation of the present invention without departing from the spirit thereof. Thus, while the principal, preferred construction, and mode of operation of the invention have been explained and what is now considered to represent its best embodiment have been illustrated and described, it should be understood that within the scope of the appended claims the invention may be practiced otherwise than as specifically illustrated and described.

What is claimed and desired to be secured by Letters Patent of United States is:

1. A space vehicle including a solar thermal propulsion unit for propelling the space vehicle comprising at least one controllable space vehicle regenerative engine including a rocket engine assembly, the rocket engine assembly further comprising in combination:

(a) a heating chamber communicating with a DeLaval nozzle and exhaust outlet wherein the heating chamber further includes,
      (i) a solar window positioned at one end of the heating chamber;
      (ii) a solar radiation absorber assembly of graded porous material in stacked configuration retained within the heating chamber intermediate the solar window and the DeLaval nozzle, the graded porous material defined by a coated graphite matrix of increasing porosity from the solar window inwardly for the passage of solar radiation and the propellant to be heated therethrough, and the coated graphit matrix being coated with a composition which is selected from the group consisting of zirconium carbide, tantalum carbide, hafium carbide and combinations thereof;
   (b) a propellant storage and delivery system for providing propellant to the rocket engine assembly;
   (c) means for delivering propellant to the rocket engine heating chamber; and
   (d) means for collecting, concentrating and delivering solar radiation to and through the solar window and into the solar radiation absorber assembly, the absorber assembly receiving concentrated solar radiation for heating a propellant passing through the absorber assembly and the DeLaval nozzle to impart thrust to the space vehicle.

2. A space vehicle including a solar thermal propulsion unit according to claim 1 in which the means for delivering propellant to the rocket engine heating chamber includes in combination a propellant storage tank, conduits, and propellant injection ports associated with the heating chamber.

3. A space vehicle including a solar thermal propulsion unit according to claim 1 in which the means for collecting, conventrating and delivering solar radiation to and through the solar window and into the solar radiation absorber assembly comprises at least one inflated paraboloid solar collector.

* * * * *